United States Patent [19]

Diepholz et al.

[11] Patent Number: 4,544,965
[45] Date of Patent: Oct. 1, 1985

[54] AUTOMATIC PREFERRED DIRECTION SELECTION FOR A BIDIRECTIONAL TAPE TRANSPORT

[75] Inventors: Tilo Diepholz; Walter Hapke, both of Hildesheim; Wilhelm Wöhl; H.-Joachim Schindler, both of Giesen, all of Fed. Rep. of Germany

[73] Assignee: Blaupunkt Werke GmbH, Hildesheim, Fed. Rep. of Germany

[21] Appl. No.: 489,822

[22] Filed: Apr. 29, 1983

[30] Foreign Application Priority Data

May 3, 1982 [DE] Fed. Rep. of Germany ....... 3216452

[51] Int. Cl.[4] .............................................. G11B 15/44
[52] U.S. Cl. ...................................... 360/71; 360/74.1
[58] Field of Search ................... 360/71, 92, 93, 96.3, 360/96.5, 96.2, 74.1, 74.2, 74.3–74.7; 242/198

[56] References Cited

U.S. PATENT DOCUMENTS

| | | | |
|---|---|---|---|
| 3,724,779 | 4/1973 | Fanella et al. | 360/71 |
| 3,810,240 | 5/1974 | Nozawa | 360/96.2 |
| 3,936,877 | 2/1976 | Maruyama et al. | 360/96.3 |
| 4,224,646 | 9/1980 | Schatteman | 360/96.3 |
| 4,301,485 | 11/1981 | Takanashi | 360/96.5 |

FOREIGN PATENT DOCUMENTS 56-169255 12/1981 Japan ........................................ 360/71

Primary Examiner—Raymond F. Cardillo, Jr.
Assistant Examiner—Steven R. Garland
Attorney, Agent, or Firm—Frishauf, Holtz, Goodman & Woodward

[57] ABSTRACT

To insure that a tape which is newly inserted into a reversing-type cassette tape transport mechanism will always operate in a first predetermined or priority direction, a direction priority switch (S3) is coupled to the tape cassette receiver (32, 34) to sense introduction of a tape into the receiver. The priority switch is coupled to a logic network which controls change-over of operation of a tape transport system (20, M) if the tape transport system, upon introduction of a tape, was operating counter the priority direction, but leaving unaffected the operation of the tape transport system if it was already in the priority direction. A suitable logic network comprises an AND-gate with a dynamic input, or one with a static input and a buffer memory which is reset upon termination of tape operation. If the tape is merely moved between a transducing position and a park or pause position, no change in direction of tape transport will result.

8 Claims, 6 Drawing Figures

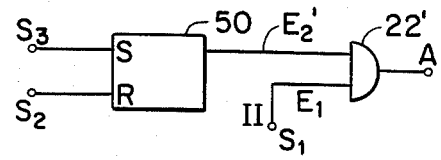
Fig. 1A
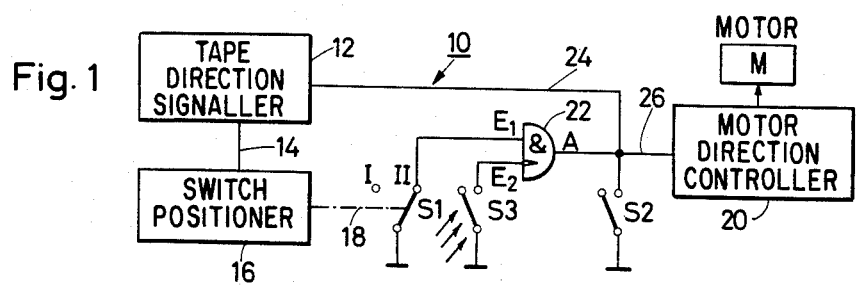
Fig. 1
Fig. 2
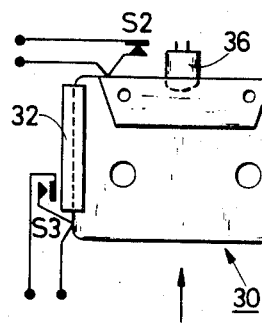
Fig. 3
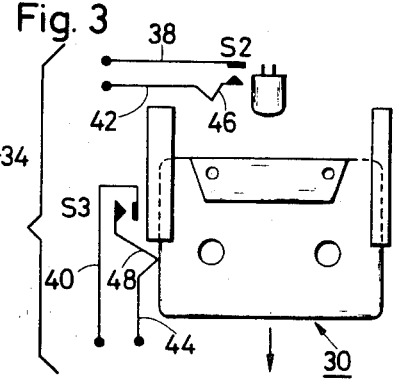
Fig. 4
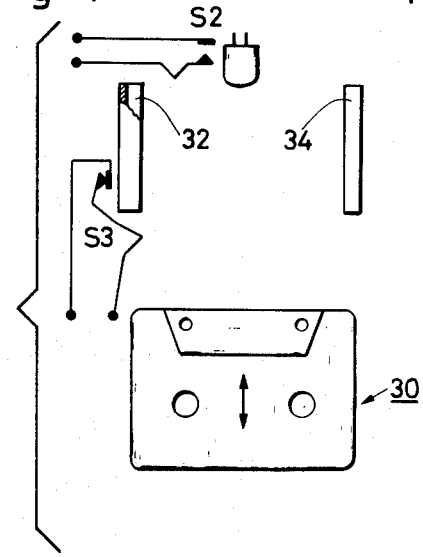
Fig. 5
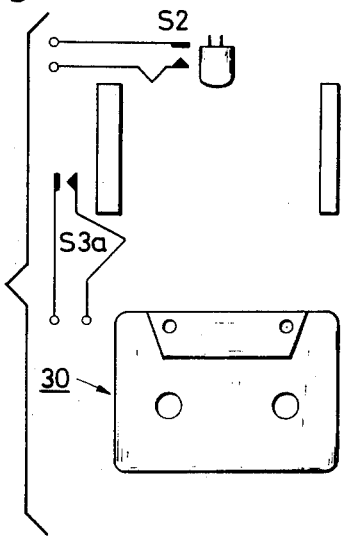

AUTOMATIC PREFERRED DIRECTION SELECTION FOR A BIDIRECTIONAL TAPE TRANSPORT

The present invention relates to tape recorder apparatus, and more particularly to tape recorder apparatus to reproduce programs recorded on an audio cassette which can operate in, respectively, reverse direction of tape run, and especially to apparatus of this kind which is suitable for combination with an automobile radio receiver.

BACKGROUND

Various types of tape transducer apparatus, particularly for use in automobile radio receiver-cassette recorder combinations, utilize tape transport mechanisms capable of operating the tape in two directions, to play back recorded programs on multiple spaced tracks. Apparatus of this kind can be controlled, for example, by a push-button or key operation to permit control of the respectively selected direction of operation of the tape. Thus, the tape can be caused to move forward or backward—with respect to a reference position—regardless of the position of an element of the tape within the transducer apparatus. After the tape has been spooled from one reel, for example a left reel to a right reel, reversal of the tape can be automatically triggered, for reproduction of further program material recorded on a different track than the initially forwardly recorded material. Such reversal can be controlled in various ways, for example by a metallized strip on the tape, by sensing rotation of the tape reels, and the like.

Tape transducer apparatus of this type are known and are used in the form of cassette decks in home-type transducer apparatus, as well as in the form of combinations with radio or other audio equipment and, frequently, are combined with automobile radios, to form radio-cassette recorder units.

Reversely operating tape transport mechanisms in such combination radio-cassette apparatus usually operate this way: Let it be assumed that a predetermined first direction of cassette operation is commanded or controlled. If the cassette is then removed from the transducer apparatus, the direction of operation previously commanded is maintained. Consequently, the probability that the desired track to be played back, upon change of a cassette, is 50%. Conversely, upon change of cassettes, the probability that the desired and expected track to be reproduced will not be that which was expected is also 50%, since the last played cassette could have operated in either direction. This is noticed, at times, only after some time has elapsed, or a portion of the program which was actually desired has been played, and found to be of the wrong kind. To then obtain reproduction of the desired programs requires respooling of the tape to the initial position, operating the "reverse run" key or push-button, remove the cassette from its cassette housing, turn it over, and then, only, initiate reproduction of the then desired track.

The foregoing difficulty is particularly annoying since the user expects the track to be reproduced which is indicated on the front or visible side of the cassette when the cassette is introduced into the apparatus. It is frequently overlooked that, for example, the preceding cassette was operating in the reverse direction.

THE INVENTION

It is an object to provide an automatic system which will control a reversely operating cassette transport system such that, upon introduction of a fresh cassette, the expected direction of operation will always pertain, regardless of prior operating conditions.

Briefly, a direction priority switch is provided operatively associated with the cassette receiving means of the reproducing apparatus—for example a slide track or the like—and sensing if the cassette is either in(a) a fully inserted, operating position, (b) a "pause" or "park" position, or (c) is withdrawn from the insertion mechanism, so that no cassette is present in the cassette transducing system. The direction priority switch is coupled to a logic circuit which, in turn, is coupled to control operation of the cassette transport mechanism, for example through a direction control circuit by supplying a direction control signal such that the tape drive system, for example a reversely operating motor, will move the ape in a predetermined direction. Thus, the direction control signal is arranged to automatically cause reversal of the previously commanded direction of operation of the tape drive under the logic conditions:

(1) The cassette receiving means is empty, that is, cassettes have been removed from the receiver;

(2) the motor drive control means was in a position in which the direction of tape operation was counter to the priority direction; and (3) a new cassette is being introduced into the receiver, for example by being pushed past the pause or park position to the operating position. The logic means, additionally, is arranged not to affect direction of operation of the motor, or of the cassette transport mechanism, if the direction of operation previously set therein is identical to the priority direction.

The priority switch may, in a simple form, be a switch having two switching states or positions which can be readily arranged on the cassette receiver, for example a receiving slide, to be operated when a cassette is inserted therein. The switch can be a momentary-operation switch, or a switch which provides a transfer signal—for example from closed to open, or open to closed position, and acting on a dynamic input of a logic gate, such as an AND-gate. The cassette, thus, itself forms the switch operating element, which changes the priority switch from one switching state to another, or causes the switch to emit a switching signal.

The invention has the advantage that, when a cassette is being introduced into the reversing-type transport mechanism, a predetermined "priority" direction will always be associated with operation of the cassette, regardless and independently of the direction of tape transport operation in which the system previously was operating.

In accordance with a feature of the invention, the reversely operating type transport mechanisms also can accomodate systems which permit a cassette to be placed in an intermediate position, which is referred to as a pause or park position, effected, for example, upon depression of a special key or push-button, or depression of an ejection key or button. In these positions, operation of the tape is interrupted, for example in order to permit listening to a radio program, e.g. a news report, or the like. In this intermediate position, it is possible to remove the cassette if it is desired to change it; if it is not desired to change the cassette, however, reproduction of the previously commanded program, in the direction of the previously demanded tape transport, can be resumed.

In accordance with a feature of the present invention, the direction of rotation of the transport system is commanded to operate in the priority direction only if (1) a cassette is entirely removed from the transducing system, and (2) either the same, or another cassette is then introduced into the cassette receiving slide or similar arrangement.

This switching may be a reversal of operation if, previously, the tape was operating counter the priority direction, or, if the tape transport already was in priority direction, leaving it unaffected. No change-over of direction of operation, that is, for example no change-over to priority direction, will occur if transport of the cassette is merely interrupted, for example upon placing the system in a "pause" mode, even if that "pause" mode includes placing the cassette into an intermediate or "park" position, and the cassette is then again later on placed into transducing position, in which it is engaged, for example, by a transducer head, drive capstans, or the like, as is well known and standard in the cassette recorder field. In such case, the last-commanded direction of operation will be maintained to continue the interrupted program from the cassette.

DRAWINGS

FIG. 1 is a highly schematic, simplified block circuit diagram illustrating the construction of the control arrangement for a tape transport system of an audio cassette recorder, and illustrating only those elements important for an understanding of the present invention, having a priority-switching arrangement which is automatically controlled upon insertion of a cassette into the apparatus;

FIG. 1A is a fragmentary diagram of the system of FIG. 1, showing a modification;

FIGS. 2, 3 and 4 are sequential diagrams of a cassette in a cassette receiver, and illustrating, respectively, switching positions, as a cassette is placed in transducing position (FIG. 2), in a partly removed position, for example a "park" position (FIG. 3), or is entirely removed from the cassette receiver (FIG. 4); and FIG. 5 is a view corresponding to FIG. 4, and illustrating another arrangement of the priority switch.

DETAILED DESCRIPTION

An audio tape recorder cassette reproducing apparatus 10, having a reversely operating tape transport mechanism (not shown in detail), and which may be of any standard construction, includes a tape direction signalling element 12, having an output control line 14 which is connected to a switch positioning element 16. Switch positioning element 16 can be an electrically triggered mechanical positioning element for a reverse-operating gearing, belting, or the like, or for control of reversal of operation. The switch positioning element 16 is mechanically connected—as schematically indicated by the chain-dotted line 18—to a direction-of-operation signalling switch S1. The signalling switch S1 has two switching positions I and II which, each, correspond, respectively, to mutually reverse directions of tape operation. For example, switch position I may correspond to reeling from left reel to right reel; and switch position II to reeling, with reproduction, from right reel to left reel.

The switch position of switch S1, thus, provides an indication of the then pertaining respective direction of operation of the tape or, respectively, of the track which is then reproduced from a cassette which is then placed in the apparatus.

Block 20 is a motion direction controller, controlling a motor M to operate in, respectively, reverse directions, or a direction-reversal gearing—which, effectively, is the equivalent of a reversely operating motor. The motor direction controller 20 can be switched over to control the respective direction of operation of the motor M, or the intermediate motion transmission system, in dependence on command signals derived from output line 14 from the tape direction signalling element 12, by an additional connection (not shown) from the switch positioner 16, or, as shown in FIG. 1, directly by a suitable signal from the direction signalling switch S1.

Control of the direction of operation of the motor M, or equivalent gearing or belt drive, is usually effected by operating a suitable push-button or key on the manual control panel (not shown) or, also, by a switching signal which is derived when the tape is completely reeled from one end to the other, for example by a metallized portion thereon. However controlled, a switching signal is generated by the tape direction signalling element 12 which, for example, senses a metallized end portion of the tape, or the position of a manually operated key. When a "reverse direction" switching signal is applied to the tape direction signaller 12, the output thereof will provide a control pulse to initiate reversal of direction of operation of the motor M through change-over of the switch positioner 16 which, for example, may be electromechanically or electromagnetically operated. The tape direction signaller 12 may be a simple electronic circuit of any suitable and standard construction, to provide a trigger output pulse to control change-over of the switch S1 and the direction of operation of the motor M through the motion direction controller 20. The switch S1 may, for example, be an electronic or an electromechanically operated switch.

Let it be assumed that a cassette 30 (FIGS. 2–5) is introduced into a cassette receiver formed by receiving guides 32, 34 (FIG. 2) and placed in "reproduce" position. When introduced in this position, as shown in FIG. 2, switch S2 will be operated. Switch S2 may be termed a cassette or oprating switch. It is coupled to the motor direction controller 20. Switch S2 commands energization of the motor circuit and, additionally, commands positioning of the tape drive, for example by engaging a presser pad against a drive capstan or the like, engagement of reel drive shafts for moving the tape from a left reel to a right reel, or the like. The construction of any of these elements can be in accordance with well known and standard commercial embodiments.

In accordance with the present invention, a predetermined direction of rotation is necessarily commanded if a cassette is newly introduced into the cassette receiver shown, schematically, by tracks 32, 34. This predetermined direction—which may be termed a "priority direction"—is commanded, in accordance with a feature of the invention, by a priority switch S3, coupled to a logic circuit. The logic circuit may, for example, be an AND-gate having a static input E1 and a dynamic input E2. In the example shown, the direction switch S1 is connected between ground or chassis and the static input E1 of the AND-gate; the priority direction switch S3 is connected between ground or chassis and the dynamic input E2. The output A of the logic circuit, that is, the AND-gate, is connected over an output control line 26 to the motor direction controller 20. A line 24, from and to the motor direction controller 20, connects the tape direction signaller 12 which may provide an output indication of the direction of operation of the tape, and determine that the switch S1 and the direction of operation of the motor are in agreement.

The switches S2 and S3 may be arranged in various ways within the cassette; FIGS. 2–4 illustrate a simple and preferred arrangement. The cassette 30, itself, forms the operating element for the switches S2 and S3, which are mechanically operated, respectively, upon introduction of the cassette within the receiving tracks. The receiving tracks 32, 34 are customarily formed by a pair of parallel, oppositely positioned U-shaped guide tracks. The receiver 32, 34 is formed with a receiving opening—at the lower side of FIGS. 2–4, and is arranged for introduction of a cassette with the tape upwardly—with respect to FIGS. 2–4—into the receiver.

The operating switch S2 is located at the terminal position of the cassette, when in operating condition. In the drawings, this is at the upper terminal position of the cassette receiver 32, 34. Besides switch S2, other elements may be located at that position, for example a pressure pad, one or more capstan drives for, respectively, different directions of operation, and the like; a transducer head 36 which may, also, include an erasing gap, or be combined with an erasing head, is likewise positioned at the reproduction end position of the receiver.

In accordance with a feature of the invention, the priority switch S3 is located along one of the longitudinal sides of the cassette receiver tracks 32, 34.

Both of the switches S2, S3 (see FIG. 3) are formed with essentially fixed contact springs 38, 40, secured within a portion of the frame or holding structure of the cassette drive, and with a movable contact spring 42 which is moved into closed or open position upon, respectively, engagement with the cassette during movement of the cassette from a removed position into a reproducing position. The movable spring 42, 44 of the switches, respectively, is preferably formed with a projecting bump or V-shaped edge 46, 48 for engagement with a respective edge portion of the cassette 30.

In the embodiment shown in FIGS. 2–4, the operating switch S2 is closed only if the cassette is in the reproducing position shown in FIG. 2, and is opened at all other positions; the priority switch S3 is closed when the cassette 30 is removed from the receiver 32, 34, and open under other conditions. In the embodiment of FIG. 5, the operating switch S2 is closed, as in FIGS. 2–4, but the priority switch S3a is opened when the cassette is removed, and closed upon introduction of a cassette.

Operation: Let it be assumed that a cassette is introduced into the receiver 32, 34. Starting from the position of FIG. 4, upon introduction of the cassette by movement upwardly—with respect to FIG. 4—the priority switch S3 will be opened. Consequently, a switching pulse will appear at the dynamic input E2 of the AND-gate 22. In the embodiment of FIG. 5, likewise, a switching pulse will occur due to closing of the switch S3a upon introduction of a cassette into the receiver. The input signal at input E1 of the AND-gate always will have a signal appear thereon when the direction switch S1 is in the position II.

In the embodiment shown, the selected direction of priority corresponds to the switching position I of the direction switch S1. This is the direction of operation which corresponds to the direction of the visible top side of the cassette 30—FIGS. 2–5—and, for example, corresponds to reeling from left to right.

When a cassette 30 is introduced into the empty receiver 32, 34—see FIG. 4 or 5—the priority switch S3 is operated so that the dynamic input E2 of the AND-gate will receive an input pulse. If, then, the direction switch S1 is in the priority direction I, no signal will appear at input E1, and the motor direction controller will not receive an input from the output terminal A of the logic circuit, thus retaining the same direction of operation. If, however, the switch S1 is in the position of II, that is, counter the priority direction—see FIG. 1—an input signal will be present at the input E1 of the AND-gate as well on the dynamic input E2 thereof, due to a pulse being applied by switch S3 or S3a, respectively. If such a pulse appears at the dynamic input E2 of the AND-gate, an output signal will appear at output A thereof which is connected over the control lines 24 and 26 to the tape direction signaller 12, and the switch positioner 16 to reposition the switch S1 and, additionally, to the motor direction controller 20 to reverse the direction of operation of the motor M.

This reversal causes the positioning element 16 to place the switch S1 in the position corresponding to the priority direction, that is, position I.

As the cassette is further introduced—see FIGS. 3 and 2—the switch S2 will be closed. This, then, will permit the motor M to operate in the direction corresponding to the previously automatically obtained priority direction.

The cassette may be placed in a "park" position by operating, for example, a "pause" or an "eject" button. This will place the cassette in the position of FIG. 3, where it can be removed from the receiver, but has not yet been removed therefrom. Switch S2 is opened, thus interrupting further tape transport, and reproduction from the cassette. The priority switch S3, however, is not affected by this partial movement of the cassette and remains in its previous position, so that no input signal will appear at the dynamic input E2 of the logic circuit. This condition will pertain even if, previously, the motor direction controller had been commanded to operate in reverse direction, so that the switch S1 was placed in the position II; this command may have been manual, or automatic, for example from an "end-of-tape" metallized strip or the like.

The previously commanded direction of operation of the tape is maintained as long as the cassette is retained within the receiver, that is, for example, when the cassette is moved from the position of FIG. 2 to the "park" position of FIG. 3, without, however, having been entirely removed from the cassette receiver. The direction of rotation previously commanded, thus, will resume when the cassette is again placed into reproducing position—FIG. 2—either automatically or manually.

In accordance with a feature of the invention, the priority direction command will become effective in dependence on the position of the direction switch S1 only after the cassette 30 is entirely removed from the receiver—see FIGS. 4 and 5—and is triggered upon introduction of a new cassette—unless, of course, the system already was in the direction of operation corresponding to the priority direction. If the tape transport mechanism, upon introduction of a new cassette, already was in the position of operation of the priority direction, the switch S1 will then already be in the priority direction corresponding to position I, so that no reversal of operating direction will take place.

Various changes and modifications may be made in the system, and particularly in the logic network. For example, the direction switch S1 can be connected to an AND-gate 22' which has two static inputs, see FIG. 1A, and the priority switch S3, or S3a, respectively, to a buffer memory or storage element 50. The switching operation, that is, the operation of the logic circuit formed by the AND-gate 22' and the buffer 50 is identical to the switching logic of the logic circuit 22 formed by the AND-gate of FIG. 1. The buffer memory 50 is SET by energization of the S input upon closing of the priority switch S3, and RESET by a reset pulse derived from the operating switch S2. In operation, let it be assumed that a cassette is introduced into the receiver 32, 34. As soon as the operating switch S2 is operated, the previously stored state of the buffer memory 50 is cancelled. Upon removal of a cassette, the buffer memory will memorize the switching state of the priority switch S3, which memorized state is cancelled upon engagement of the switch S2. Of course, other changes may be made in the logic circuit. For example, the logic circuit may be formed with three separate inputs for the direction switch S1, the priority switch S3, and the operating switch S2.

The particular arrangement of the switching network, and which switching arrangement has priority assigned thereto, depends, essentially, on the specific construction or the basic circuit of the respective apparatus with which the present invention is to be used. Since various control systems, circuits and mechanical or electro-mechanical arrangements may be used, various other modifications may be made within the scope of the present invention to incorporate the concept thereof in such other switching arrangements.

For example, if the cassette receiver 32, 34 does not permit installation of a mechanical switch, other switches may be used, for example an opto-electronic sensing switch of standard and well known construction.

The optical operation of the switch S3 is shown, for example, schematically by the light arrows to switch S3 of FIG. 1.

We claim:

1. Bidirectional tape transport apparatus having
a tape drive means (M, 20) including a motor direction control means (20) controlling the direction of operation of tape being transported in the apparatus;
a tape direction signalling means (12, S1) coupled to the tape drive means and providing a tape direction output signal (14) representative of the direction of transport of the tape in the apparatus;
cassette receiving means (32, 34) to receive a tape cassette (30) and, selectively, position said tape cassette in
(a) a transducing position, in which the cassette is entirely retained in the receiving means; and
(b) a park position in which the cassette is moved away from the transducing position, but retained with the receiving means; and
the cassette receiving means permitting
(c) placing the cassette in a removed position in which the cassette is removed from the receiving means,
said apparatus comprising, in accordance with the invention,
a direction priority switch (S3) operatively associated with the cassette receiving means (32, 34) and sensing the location of the cassette in the respective positions (a), (b), or (c); and
logic means (22; 50, 22') including an AND-gate (22, 22') coupled to the direction priority switch (S3) and the tape direction signalling means (S1), connected to and providing a direction control signal to the motor direction control means (20) and controlling reversal of direction of operation of said tape drive means under the logic conditions;
(1) the cassette receiving means is empty, so that the cassette is in position (c);
(2) the motor drive control means was in a position in which the direction of tape operation was counter the priority direction; and
(3) a cassette is being introduced into the cassette receiving means by being moved from position (c) to at least position (b).

2. Apparatus according to claim 1, wherein said AND-gate has a dynamic input (E2), said direction priority switch (S3) being connected to apply a pulse to said dynamic input upon change of switching state of said direction priority switch under control of movement of the cassette (30) in insertion direction; and said AND-gate has a second input connected to the tape direction signalling means (12, S1).

3. Apparatus according to claim 1, wherein said logic means comprises a buffer memory (50) and an AND-gate, said buffer memory being connected to one of the inputs of the AND-gate (22') and, in turn, connected to be controlled by said priority switch (S3), said tape direction signalling means (12, S1) being connected to a second input of said AND-gate (22').

4. Apparatus according to claim 1, wherein said cassette receiving means includes an operating switch (S2) operable by engagement with the cassette, when the cassette is placed in the position (a).

5. Apparatus according to claim 4, wherein said operating switch (S2) is connected to said logic means (22; 22', 50).

6. Apparatus according to claim 1, wherein the cassette receiving means (32, 34) comprises a guide track receiver to receive said cassette in sliding movement therein;
and said direction priority switch (S3) is positioned with respect to the guide tracks to be engaged by a cassette moved between the positions (c) and (b), and located adjacent the entrance to said guide tracks.

7. Apparatus according to claim 6, wherein the direction priority switch comprises a movable terminal spring element (44) having an engagement portion (48) located in interfering position with respect to a guide path of a cassette in said guide tracks to be operated upon insertion of a cassette into said cassette receiving means.

8. Apparatus according to claim 6, wherein said direction priority switch (S3) comprises an opto-electronic switch.

* * * * *